US 11,745,638 B2

United States Patent
Remus

(10) Patent No.: US 11,745,638 B2
(45) Date of Patent: Sep. 5, 2023

(54) TRUCK BED RISER

(71) Applicant: CCR Sales, LLC, Arpin, WI (US)

(72) Inventor: Andrew C. Remus, Arpin, WI (US)

(73) Assignee: CCR Sales, LLC, Arpin, WI (US)

( * ) Notice: Subject to any disclaimer, the term of this patent is extended or adjusted under 35 U.S.C. 154(b) by 18 days.

(21) Appl. No.: 17/510,773

(22) Filed: Oct. 26, 2021

(65) Prior Publication Data

US 2022/0134853 A1 May 5, 2022

Related U.S. Application Data

(60) Provisional application No. 63/107,241, filed on Oct. 29, 2020.

(51) Int. Cl.
| | |
|---|---|
| *B60P 7/08* | (2006.01) |
| *B60J 7/11* | (2006.01) |
| *B60J 7/16* | (2006.01) |
| *B60J 7/14* | (2006.01) |
| *B60P 7/06* | (2006.01) |

(52) U.S. Cl.
CPC .............. *B60P 7/0815* (2013.01); *B60J 7/11* (2013.01); *B60J 7/141* (2013.01); *B60J 7/1607* (2013.01); *B60P 7/06* (2013.01)

(58) Field of Classification Search
CPC . B60J 7/141; B60J 7/1607; B60P 7/02; B60P 7/06; B60P 7/08; B60P 7/0815
USPC .............................................. 296/36, 100.17
See application file for complete search history.

(56) References Cited

U.S. PATENT DOCUMENTS

| | | | |
|---|---|---|---|
| 4,650,382 A * | 3/1987 | Johnson ................ | B60P 7/0815 |
| | | | 410/116 |
| 4,936,724 A * | 6/1990 | Dutton .................... | B60R 13/01 |
| | | | 296/100.18 |
| 5,228,736 A * | 7/1993 | Dutton .................. | B60P 7/0815 |
| | | | 296/100.18 |
| 5,251,950 A | 10/1993 | Bernardo | |
| 5,360,250 A | 11/1994 | Wood et al. | |
| 5,454,612 A | 10/1995 | Christensen | |
| 6,279,980 B1 | 8/2001 | Straschewski | |
| 6,312,034 B1 | 11/2001 | Coleman, II et al. | |
| 6,712,418 B1 | 3/2004 | Lathers | |
| 7,226,100 B1 | 6/2007 | Willey et al. | |
| 8,684,439 B1 | 4/2014 | Calvert | |

(Continued)

FOREIGN PATENT DOCUMENTS

CA          2298080 C       3/2004

OTHER PUBLICATIONS

Truck Bed Rails, Highway Products Inc., https://www.highwayproducts.com/p/truck-bed-rails/, Jan. 21, 2022, 2 Pages.

(Continued)

*Primary Examiner* — Jason S Daniels
(74) *Attorney, Agent, or Firm* — Breiner & Breiner, L.L.C.

(57) ABSTRACT

A truck bed riser providing additional hauling capacity having a front riser member, a first side riser member, a second side riser member and a tailgate riser member. The riser members are adapted to connect to each other and to be held to the truck bed, preferably by clamp members. The truck bed riser may include a cover which is attached to the top portion of the four riser members and held in place by suitable means such as clamps or velcro. Preferably, the truck bed riser is made of aluminum.

14 Claims, 4 Drawing Sheets

(56) References Cited

U.S. PATENT DOCUMENTS

| | | | |
|---|---|---|---|
| 8,857,880 B2 | 10/2014 | Kalergis et al. | |
| 9,540,050 B2 | 1/2017 | Miller | |
| 9,834,259 B2 | 12/2017 | Smith | |
| 10,029,603 B2 | 7/2018 | Stocks et al. | |
| 10,300,963 B2* | 5/2019 | Puchkoff | B62D 33/0207 |
| 10,773,758 B2* | 9/2020 | Roberts | B62D 33/0207 |
| 10,875,585 B2* | 12/2020 | Brown | B60J 7/1607 |
| 2002/0012576 A1* | 1/2002 | Anderson | B60P 7/0815 |
| | | | 410/106 |
| 2003/0098590 A1 | 5/2003 | Chechuck | |
| 2008/0143133 A1* | 6/2008 | Nichols | B60P 7/0815 |
| | | | 296/136.03 |
| 2015/0008693 A1 | 1/2015 | Andreou | |
| 2016/0107515 A1* | 4/2016 | Shi | B60J 7/062 |
| | | | 296/100.18 |
| 2017/0166264 A1 | 6/2017 | Puchkoff | |
| 2017/0174119 A1* | 6/2017 | Hemphill | B60R 9/00 |
| 2018/0244213 A1* | 8/2018 | Luciew | B60P 7/0815 |
| 2019/0210664 A1 | 7/2019 | Williams | |

OTHER PUBLICATIONS

Truck Bed Rails, Cargo Gear, https://cargogear.com/infolib.aspx?lookup=CIRAILS&image=cirailsjpg, Jan. 21, 2022, 2 Pages.

Brandon Libby, Expedition Portal, Truck/SUV Drawer Buyer's Guide, https://expeditionportal.com/trucksuv-drawer-buyers-guide/, May 2, 2017, 27 Pages.

Roll-N-Lock Retractable Truck Bed Cover, M-Series, E-Series, A-Series, https://rollnlock.com, Jan. 21, 2022, 6 Pages.

\* cited by examiner

TRUCK BED RISER

RELATED APPLICATION

This application claims benefit of U.S. Provisional Application Ser. No. 63/107,241, filed Oct. 29, 2020, entitled "Truck Bed Riser," which application is incorporated herein by reference in its entirety.

FIELD OF THE INVENTION

The present invention relates to a truck bed riser. More particularly, the invention relates to a truck bed riser providing additional vertical hauling capacity for a truck.

BACKGROUND OF THE INVENTION

Generally, pickup trucks have an open bed which is accessed by a tailgate. The truck bed comprises a bed and four body panels normally about 21 inches high, that is body side walls, an end wall and a tail gate. The truck bed is open allowing for the hauling or carrying of various materials. It is known in the art to have a truck bed cover, whether flexible or hard sided, which is attached to the panels and covers the truck bed. This keeps the material being transported protected from the outside environment, e.g. rain, wind or snow. However, the vertical hauling capacity of the truck bed is diminished and is generally about 21 inches corresponding to the truck body panels. There is also known in the art to use a truck bed topper which is generally the height of truck bed cab. However, truck bed toppers are expensive and not aesthetically pleasing.

Accordingly, the known truck bed covers and toppers have various shortcomings. These and other shortcomings are addressed by the present invention.

SUMMARY OF THE INVENTION

A primary object of the invention is to provide for a novel truck bed riser which adds to the vertical hauling capacity of a truck.

Another primary object of the invention is to provide a truck bed riser which is aesthetically pleasing.

Another primary object of the invention is to provide a truck bed riser which may receive a truck bed cover to enclose the truck bed, thereby covering the materials being transported from the outside environment.

Another primary object of the invention is to provide a truck bed riser for providing more vertical hauling capacity and at the same time allowing for easy loading and unloading of the truck.

Another primary object of the invention is to provide a truck bed riser which includes one or more handles for providing ease of access for getting into or out of the truck.

The present invention is directed to a truck bed riser comprising a front riser member, a first side riser member, a second side riser member and a tailgate riser member. The riser members are adapted to connect to each other and to be held to the truck bed, preferably by clamp members. The truck bed riser may include a cover which is attached to the top portion of the four riser members and held in place by suitable means such as clamps, Velcro or the like. Preferably, the truck bed riser is made of aluminum, although other materials may be used without departing from the scope of the invention.

These primary and other objects of the invention will be apparent from the following description of the preferred embodiments of the invention and from the accompanying drawings.

BRIEF DESCRIPTION OF THE DRAWINGS

The following detailed description of the specific non-limiting embodiments of the present invention can be best understood when read in conjunction with the following drawings, where like structures are indicated by like reference numbers.

Referring to the Drawings.

DETAILED DESCRIPTION OF THE PREFERRED EMBODIMENTS

The present invention is directed to a truck bed riser. The truck bed riser provides for additional hauling capacity for a truck. A primary aspect of the invention is the use of a truck bed riser on a pickup truck. The truck bed riser may be used with a cover to provide for additional hauling capacity to the pickup truck and to keep the material in the truck bed safe from weather and theft.

Figure 3:
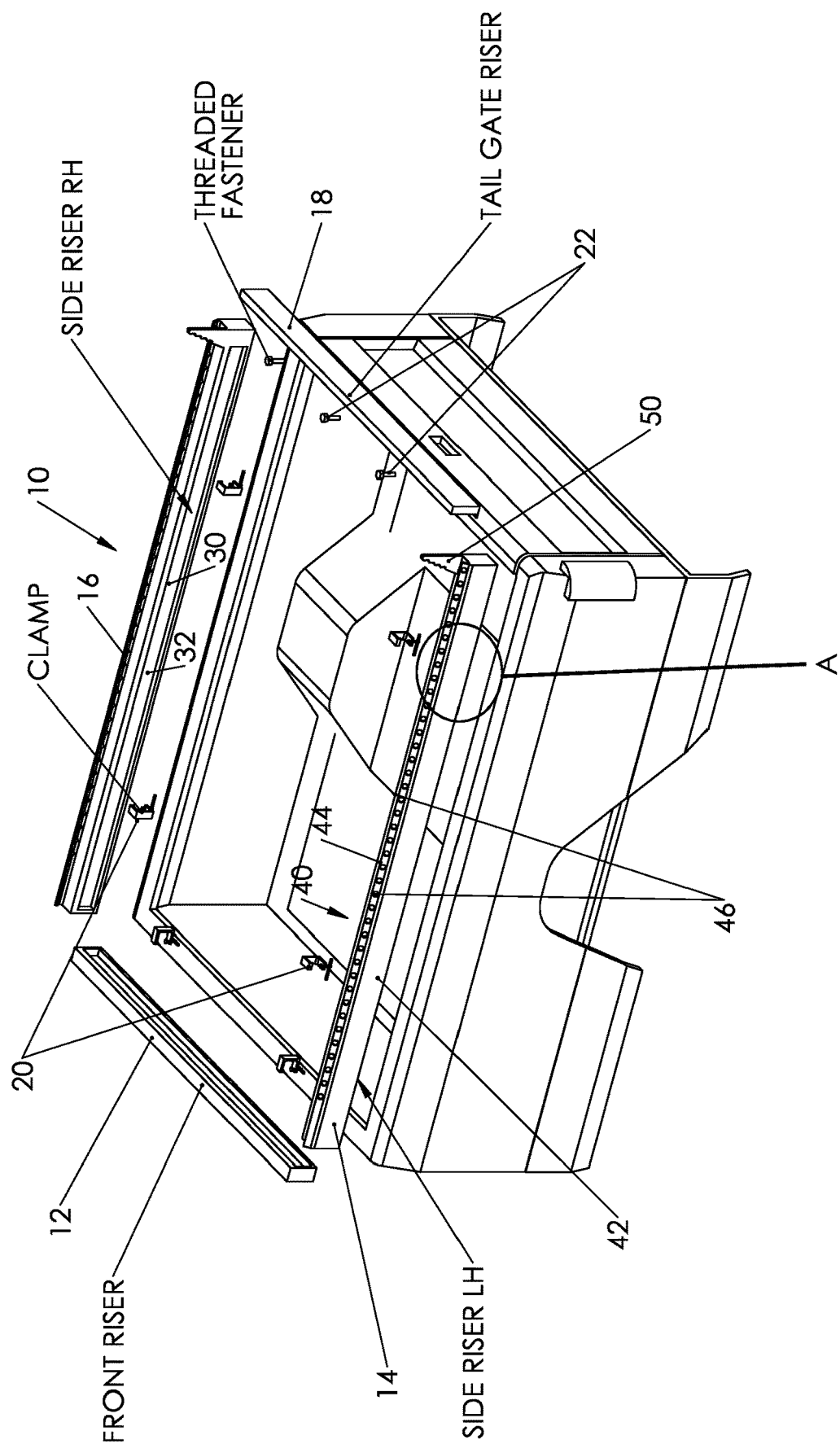
FIG. 3 is an exploded view of the truck bed riser of FIG. 2.
Figure 4:
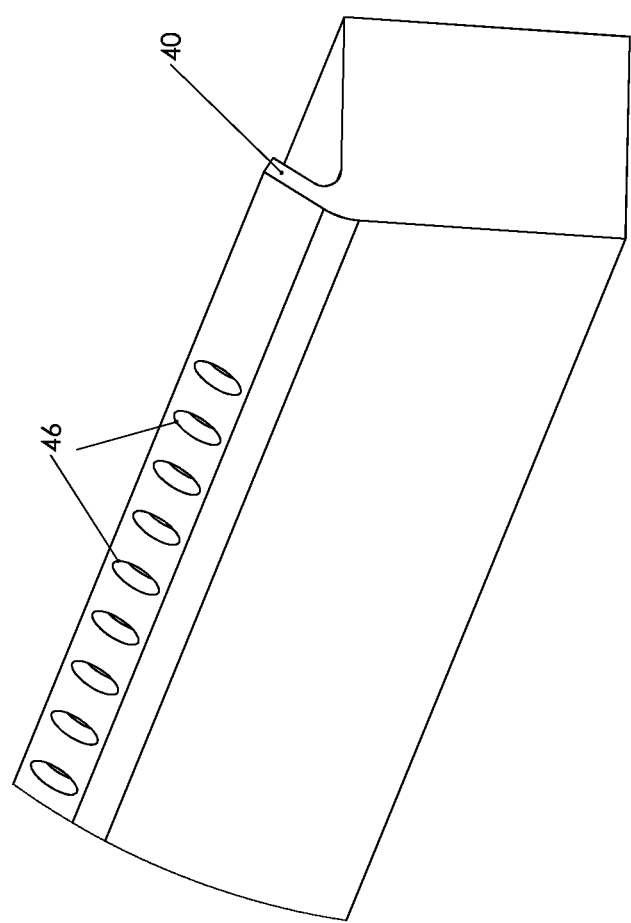
FIG. 4 is an enlarged view of riser 14 at A of FIG. 3.

Referring to the figures, the truck bed riser 10 includes four riser members, namely, a front riser member 12, a first side riser member 14, a second side riser member 16 and a tailgate riser member 18. In a preferred embodiment, the front and side risers have a width of 2 to 3 inches and the tailgate riser a width of 1.5 to 2 inches, and the four risers have a height of 4 to 6 inches. Riser members 12, 14 and 16 are attached to the truck bed by clamps 20 which engage a bottom portion of the riser members and an underside portion of the truck bed frame. The tailgate riser is attached to the tailgate by threaded fasteners 22. The riser members are preferably made of aluminum by extrusion, although other materials may be used such as a hard plastic without departing from the scope of the invention. Referring to FIG. 3, the riser members include an inside portion 30 which includes an elongated slot 32. This provides for less material and a lighter weight riser member, a means for the clamp member 20 to attach the riser to the truck bed frame and an aesthetically pleasing structure. Additionally, referring to FIG. 4, the truck bed riser may include a raised portion 40, side wall 42, 44 and holes 46 for tying or securing a load to the truck bed. The side riser members may include a handle members 50 and 52 for grasping for ease of entering or leaving the truck.

Figure 1:
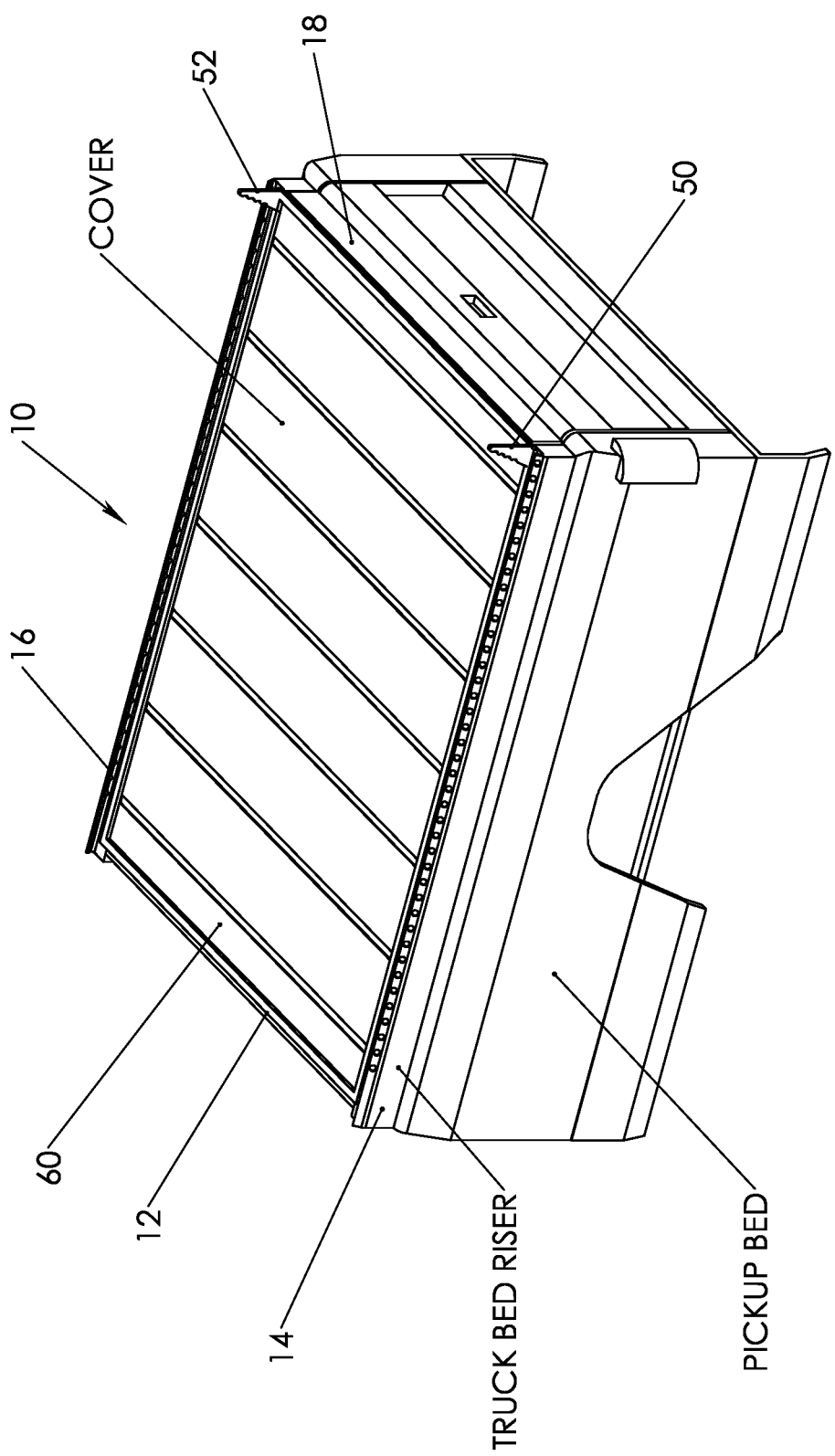
FIG. 1 is a perspective view of the truck bed riser invention attached to a pickup truck and including a cover.
Figure 2:
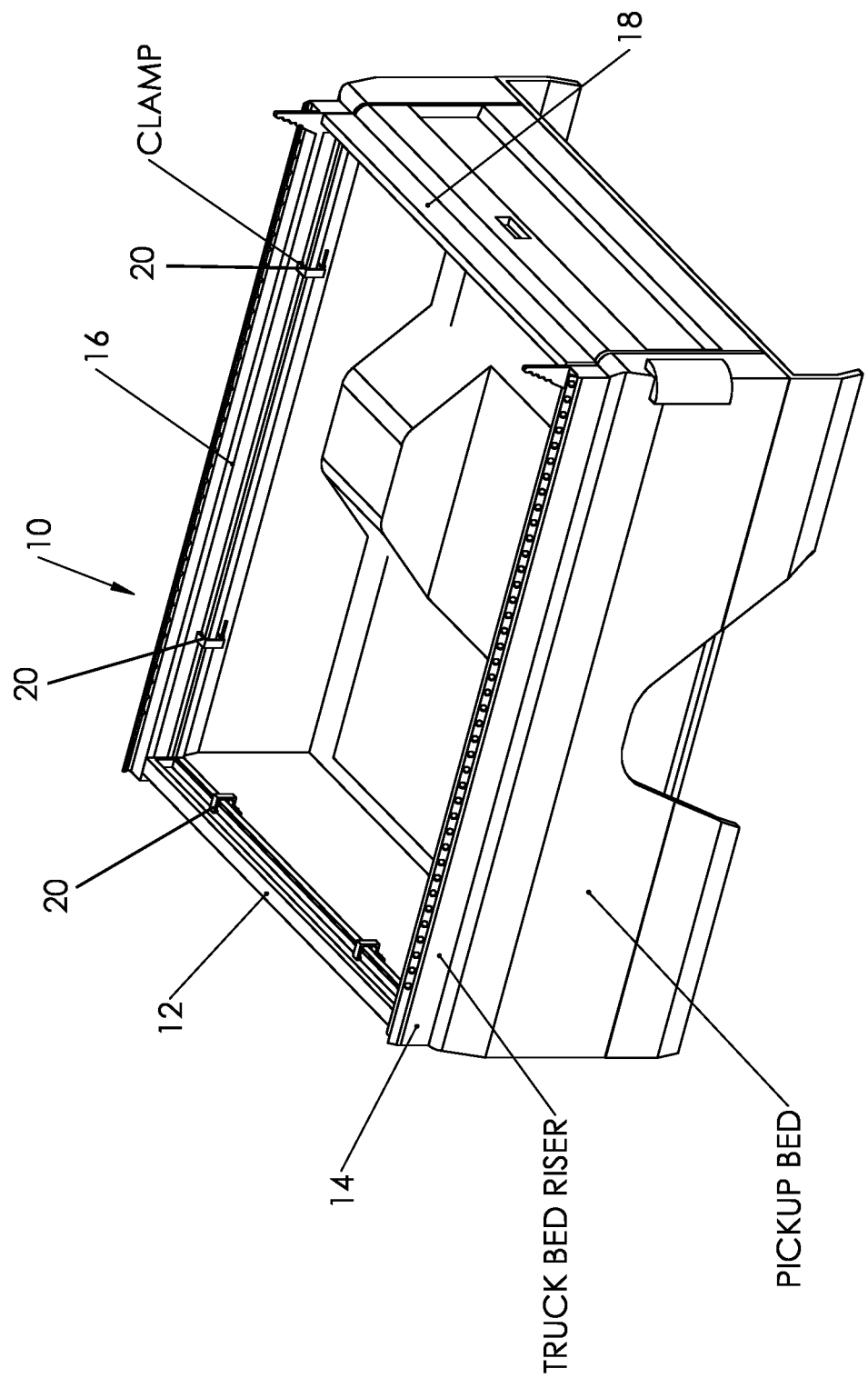
FIG. 2 is another perspective view of the truck bed riser invention attached to a pickup truck and held in place by clamp members.

As seen in FIG. 1, a cover 60 may be attached to the top of the riser members to enclose the truck bed and keep the truck bed free from the environment, including rain, wind and snow. The cover further protects materials inside the truck from being stolen. The cover member may be attached to the riser by Velcro, clamps or other attachment means.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. For example, other fastener means may be used to attach the riser members to the truck bed without departing from the scope of the invention. Such modifications being within the ability of one skilled in the art form a part of the present invention and are embraced by the appended claims.

It is claimed:

1. A truck bed riser providing additional hauling capacity for a truck comprising a front riser member adapted to be connected to a front wall of the truck bed, a first side riser member adapted to be connected to a first side wall of the truck bed, a second side riser member adapted to be connected to a second side wall of the truck bed and a tailgate riser member adapted to be connected to a tail gate of the truck bed, the riser members are adapted to connect to each other and to be held to the truck bed by clamp members or fasteners, wherein each of the front, sides and tailgate riser members are rectangular and having a height of four inches or greater adapted to provide for the additional hauling capacity, and wherein the truck bed riser may optionally include a cover which is attached to the top portion of the four riser members.

2. The truck bed riser of claim 1 wherein the first and second riser members include a raised portion.

3. The truck bed riser of claim 2 wherein the raised portion includes one or more openings.

4. The truck bed riser of claim 1 wherein at least one of the first and second riser members adjacent to the tailgate riser member includes a handle extending upwardly from the riser.

5. The truck bed riser of claim 4 wherein both the first and second riser members includes a handle.

6. The truck bed riser of claim 1 wherein each of said riser members is made of aluminum.

7. The truck bed riser of claim 1 wherein at least one of the first, second and third riser members include an elongated open slot on an inside wall of the riser member.

8. A pickup truck having a truck bed riser providing additional hauling capacity for the pickup truck, wherein the truck bed riser comprises a front riser member adapted to be connected to a front wall of the truck bed, a first side riser member adapted to be connected to a first side wall of the truck bed, a second side riser member adapted to be connected to a second side wall of the truck bed and a tailgate riser member adapted to be connected to a tail gate of the truck bed, the riser members are adapted to connect to each other and to be held to the truck bed by clamp members or fasteners, wherein each of the front, sides and tailgate riser members are rectangular and having a height of four inches or greater adapted to provide for the additional hauling capacity, and wherein the truck bed riser may optionally include a cover which is attached to the top portion of the four riser members.

9. The pickup truck of claim 8 wherein the first and second riser members include a raised portion.

10. The pickup truck of claim 9 wherein the raised portion includes one or more openings.

11. The pickup truck of claim 8 wherein at least one of the first and second riser members adjacent to the tailgate riser member includes a handle extending upwardly from the riser.

12. The pickup truck of claim 11 wherein both the first and second riser members includes a handle.

13. The pickup truck of claim 8 wherein each of said riser members is made of aluminum.

14. The pickup truck of claim 8 wherein at least one of the first, second and third riser members include an elongated open slot on an inside wall of the riser member.

\* \* \* \* \*